Dec. 17, 1968  G. T. BROWN ET AL  3,417,175
METHOD FOR RELIEF DECORATING PLASTIC MOLDED ARTICLES
Filed July 15, 1965  2 Sheets-Sheet 1
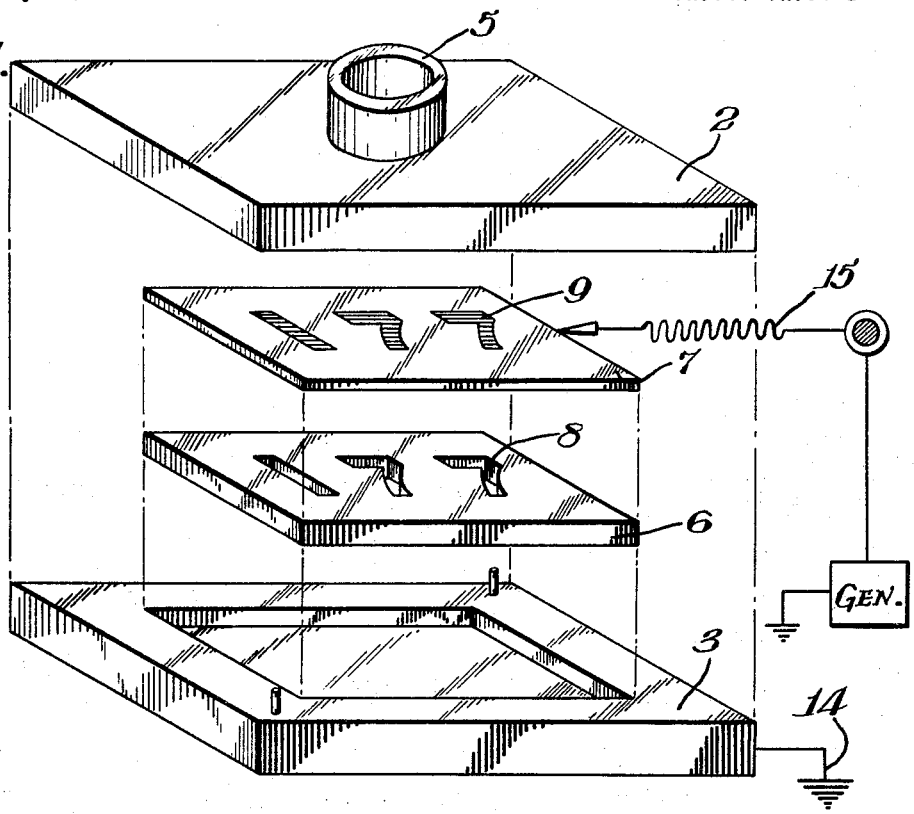
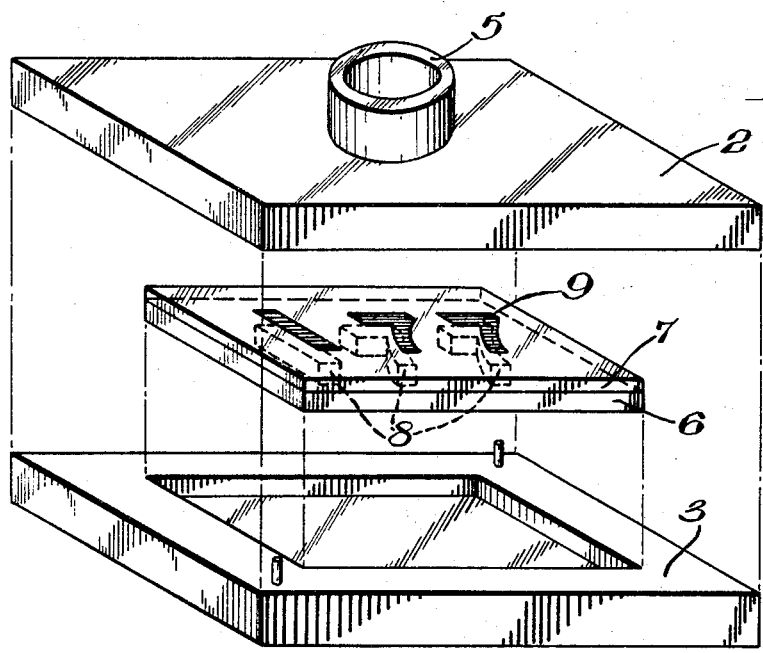
INVENTORS
George T. Brown
Walter L. Hochner
Frederick T. Marston
BY Connolly and Hutz
ATTORNEYS

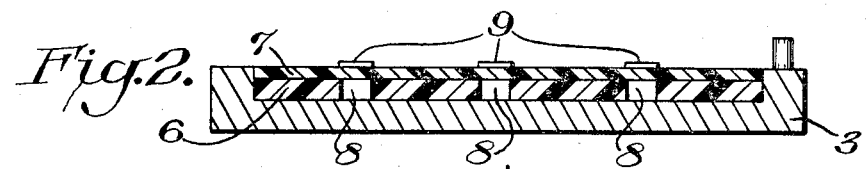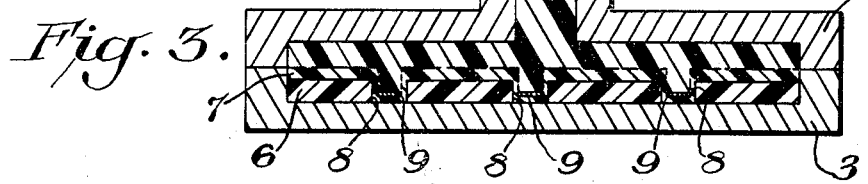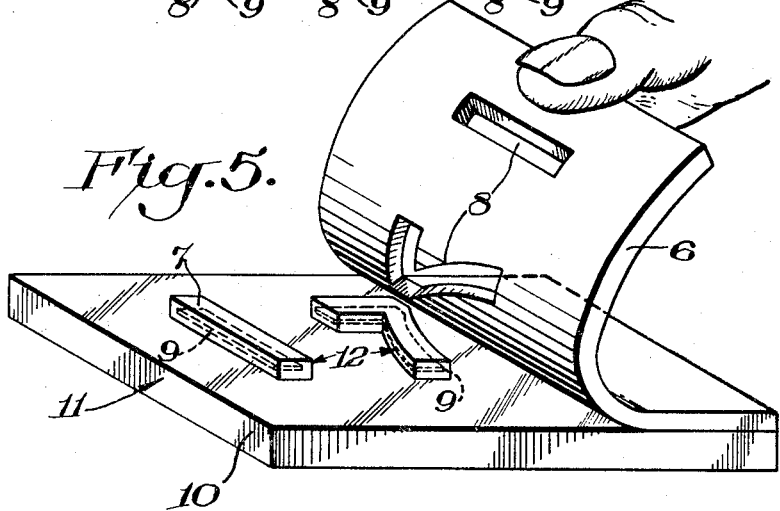

3,417,175
METHOD FOR RELIEF DECORATING PLASTIC MOLDED ARTICLES
George T. Brown, Walter L. Hochner, and Frederick T. Marston, Wilmington, Del., assignors to Kaumagraph Company, Wilmington, Del., a corporation of Delaware
Filed July 15, 1965, Ser. No. 472,263
14 Claims. (Cl. 264—220)

ABSTRACT OF THE DISCLOSURE

Method for producing molded articles having relief decoration by positioning a nonadherent, strippable sheet conforming, at least in part, to the desired decoration between a nondeformable mold surface and a polymeric moldable material, contacting the material and mold surface under heat and pressure, cooling the molded material and removing the nonadherent sheet therefrom.

---

The present invention relates to a composite decorating sheet, a method for decorating molded plastic articles and the molded plastic articles produced thereby. More particularly the invention is directed to a novel method and decorating sheet for manufacturing a relief decorated or marked molded plastic article which provides either raised or indented decorations on the molded material which decorations may or may not be additionally colored and the molded, relief decorated articles produced thereby.

Molded plastic articles have been decorated or marked by many methods known in the prior art. Illustrative decorating means include conventional printing means, labels, silk screening, foil overlays, spraying, painting, decalcomania, laminating, etc., with or without additional decoration providing or decoration protecting overlays. Generally such decorating means were directed to the production of flat decorations on the molded surface and indeed interest has been directed primarily towards printing or molding-in the decoration to produce substantially no physical or visual distinction or separation between the surface of the molded article and the edges of the decoration.

For many decoration and design effects, however, it is desirable to have the decoration or marking either raised or indented (i.e., in relief) relative to the surface of the molded article. Thus certain advertising effects require raised or indented lettering or decoration as do such strictly utilitarian objects as keys, license plates, bottles, etc. Not only should the design or marking be raised or indented but in many cases it should also be colored differently from the remainder of the article.

One obvious method of accomplishing this result is to utilize a mold, the walls of which conform not only to the base article but also to the desired raised or indented design. Once molded, the indented or raised portions can thereafter be colored in a separate step by printing, decaling, etc. Needless to say, such a two step procedure is expensive and time consuming. Furthermore, even where no additional coloration is desired, to cut a given mold to conform to the desired decoration is not cheap and, additionally, the mold can only be used to produce a single decoration. Producers of novelty items or advertisings, for example, must change the decoration, marking, lettering, etc., many times even with the same base article due to the requirements of different customers. To be required to use a different mold each time and to make a separate and new mold for each different lettering, marking, etc., would be too expensive for practical use where an inexpensive article is desired.

It is an object of this invention to provide a novel composite decorating sheet, a novel method of producing a relief decorated molded plastic article and the novel relief decorated plastic article produced thereby. A further object of this invention is to produce a one piece molded plastic article wherein the decoration, marking, lettering, etc., is in relief (i.e., raised and/or indented as desired). An additional object is to provide a one piece molded article wherein the relief decoration, marking, lettering, etc., is differently colored (one or more colors) from the base article itself. The production of a novel composite decoration sheet to be used in the making of such articles is an additional object of this invention. Another object of the invention is a single step method which will simply and economically produce a one piece molded plastic article having raised and/or indented as well as differently colored decoration, marking, lettering, etc. Other objects of the invention will become apparent as the description proceeds.

The present invention has applicability to any molding method wherein a natural or synthetic polymeric moldable material is shaped to the configuration of at least one non-deformable surface by contacting the polymeric moldable material with the non-deformable surface under heat and pressure. It has been found that articles produced by the above method may be relief decorated in a pleasing, simple and economical manner by use of a separate non-adherent sheet, the configuration (internal and/or external) of which conforms at least in part to the desired relief decoration and the composition of which renders it, under the heat and pressure applied, non-adhering to the polymeric moldable material and strippable therefrom after cooling. Such a non-adherent sheet is positioned between the non-deformable surface and the polymeric moldable material and the polymeric moldable material and the non-deformable surface are then contacted under heat and pressure. It has been further found that additional decorative effects may be obtained by the conjoint use of a separate decorated sheet, the composition of which renders it, under the heat and pressure applied, adherent to the polymeric moldable material but non-adherent to the non-adherent sheet. Such an adherent sheet is positioned between the non-adhering sheet and the polymeric moldable material.

Numerous molding methods known in the prior art may be utilized in the present invention. Illustrative conventional methods include injection molding, blow molding, vacuum molding, compression molding, etc. Natural or synthetic polymeric moldable materials include both the thermoplastic materials (which rely on a melting effect) or thermosetting materials (which undergo a substantially irreversible chemical reaction, e.g., cross linking). Included within such materials are the polyolefin homopolymers and copolymers, phenol-aldehydes, aminotriazine-aldehydes, polycarbonates, natural and synthetic rubbers, cellulosic resins, acetal resins, polyesters, vinyl resins, polyamides, silicon resins, epoxides, alkyds, etc.

The process of blow molding is well known in the art and basically involves extruding or otherwise forming a hot, soft tube of thermoplastic material (a parison), piercing it with a blowing air injection needle, clamping it immediately in the mold, expanding it within the mold by gas pressure (e.g., compressed air) to the shape of the cavity, cooling and ejecting the article from the mold. Blow pressures can range from 25 to 200 p.s.i. depending on the materials used. The mold temperature usually ranges from 60 to 280° F. and when extruded, temperatures and pressures during extrusion range from 300 to 500° F. and 1,000 to 4,000 p.s.i. Suitable thermoplastic materials include polypropylene, polyethylene, polyvinyl chloride, acetal resins, polycarbonates, cellulosic resins (ethyl cellulose, cellulose acetate, etc.), polyacrylics (polyacrylates, methacrylates, etc.) and the like.

Compression molding is likewise well known and involves placing thermosetting plastic molding powder or a preform in a hot cavity and applying heat and pressure. The temperature and pressure is usually interdependent and also dependent on the particular resin utilized. As a general rule, temperatures between 200 and 400° F. are used with pressures ranging from 500 to 10,000 p.s.i. Suitable thermosetting materials include casein, furan, dialkyl phthalate and epoxide molding compounds as well as melamine-formaldehyde, phenol-formaldehyde, polyesters, alkyds, silicons, urea-formaldehyde, etc. The molding powder may be unfilled or may be filled with such materials as glass, asbestos, alpha cellulose, flock, silica, etc.

In injection molding, a thermoplastic compound is melted and then shot (injected) under pressure into a closed mold where it is cooled and hardened. The molded piece is usually removed from the mold as soon as it is rigid enough to handle. Thermoplastic materials useful in injection molding include acrylics, nylons (polyamides), polyallomers, polyolefins (polyethylene, polypropylene, etc.), ABS resins (acrylonitrile-butadiene-styrene copolymers), cellulosics, polystyrene, polycarbonate, vinyl, etc. Injection temperatures between 250 and 760° F. and pressures between 8,000 and 32,000 p.s.i. are generally used.

Vacuum molding involves the use of a thermoplastic material, normally in sheet form, which is softened by the application of heat (uniformly or with higher heat applied to the areas of greatest deformation) and is forced against a mold wall by atmospheric pressure due to a vacuum being applied between the heated thermoplastic and the mold wall. Thermoplastic materials such as those mentioned above can be utilized.

The above illustrative molding techniques are well known and do not require further elaboration. For purposes of illustration, the invention will be discussed with relation to injection molding which is the preferred embodiment according to the invention, it of course being understood that any shaping means involving conforming a natural or synthetic polymeric moldable material to the configuration of at least one non-deformable surface by applying heat and pressure is applicable to the present invention.

According to one embodiment of the invention, a relief decorated injection molded article is formed by inserting into the injection mold a film or sheet of a material that does not adhere to the plastic compound injected into the mold under injection molding conditions. The inserted sheet has internal and/or external boundaries corresponding to the desired relief decoration to be applied. The sheet is positioned and held in the mold prior to and during injection by any feasible method. The molten plastic compound injected into the mold fills closely around the configuration of the sheet. After molding, the non-adherent sheet is stripped from the injection molded article leaving raised or indented injected material to provide the desired relief decoration.

When it is also desired to color the indented or raised design, an additional decorated adherent sheet is utilized between the non-adhering sheet and the injected plastic mass. This additional sheet is of a composition such that it adheres to the injected plastic mass but not to the non-adherent sheet. A decoration is printed thereon in a known manner with the desired color or colors in a shape generally corresponding to the configuration portions of the non-adhering sheet which are to comprise the relief decoration. The adhering and non-adhering sheets are placed in register and in the mold with the non-adhering sheet positioned against the mold wall. During molding the injected mass fills closely around the configuration of the non-adherent sheet and pushes the adhering sheet in close conformity with the non-adherent sheet as well. The resulting article after stripping carries a raised or indented and colored design. The adhering sheet becomes integrally and interfacially bonded to the injected mass and visually and physically inseparable therefrom.

The novel features and advantages of the present invention will become apparent to one skilled in the art from a reading of the following description in conjunction with the accompanying drawings wherein similar reference characters refer to similar parts and in which:

FIG. 1 is an exploded perspective view showing an injection mold in open position and illustrating the separate positioning in the mold and in register of an internally cut out non-adhering sheet and a decorated clear adhering sheet, FIG. 1A is an exploded view showing the mold in an open position and illustrating the positioning in the mold of a combined and in register internally cut out non-adhering sheet and a decorated clear adhering sheet, FIG. 2 is a cross sectional view showing the internally cut out non-adhering sheet held in position against the wall of the female mold with the decorated adhering sheet in register therewith prior to injecting the plastic mass, FIG. 3 is a cross sectional view showing the mold in closed position after injection of the molten thermoplastic mass, FIG. 4 is a perspective view of the article removed from the mold and prior to stripping, and FIG. 5 is perspective view of the article during the stripping operation.

FIGS. 1 through 5 illustrate the production of an automobile license plate according to one embodiment of the present invention in which not only are the numbers raised but also the numbers are colored in a single molding step. In FIG. 1 mold halves 2 and 3 of a conventional injection mold are shown in open position. Mold half 2 contains sprue 5 having a gate (not shown) in the mold cavity for the introduction in a conventional manner of molten plastic material. According to the invention a sheet of plastic material 6 (e.g., polypropylene) is first placed in the mold in the proper position and held against the mold wall by, for example, an electrostatic charge. This sheet has internally cut out numbers 8 and the composition of this sheet is such that it will not become fused to or adhere with the injected plastic mass 10 (e.g., polystyrene) or adhering sheet 7 (also of polystyrene) at any point where it contacts them. On top of sheet 6 is placed an additional and decorated film 7 of, for example, polystyrene, the decorations of which are desired numbers 9 in the desired colors. This sheet is composed of a material which adheres to the injected plastic mass but not to non-adherent, cut out film 6. Sheet 7 is also held in the mold (in register against cut out, non-adhering sheet 6) by suitable means such as an electrostatic charge. For this purpose there is used static electricity generator 15 which can be operated by AC or DC power. Mold half 3 is grounded at ground connection 14 to prevent shocking the operator.

FIG. 2 is a cross sectional view showing non-adhering sheet 6 held against the mold wall and adhering sheet 7 positioned on non-adhering sheet 6. Cut out numbers 8 and printed numbers 9 are in register. The mold can now close and plastic mass 10 is injected through sprue 5 (see FIG. 1).

FIG. 3 is a cross sectional view of mold halves 2 and 3 in a closed position after plastic mass 10 has been injected therein. The plastic mass injected is in this case colored a contrasting color as compared with printed numbers 9. As can be seen, plastic mass 10 fills the mold cavity under high pressure and presses adherent sheet 7 and printed numbers 9 through cut out numbers 8.

FIG. 4 shows molded article 11 including adherent sheet 7 and non-adherent sheet 6 after article 11 has been removed from the mold but prior to stripping.

FIG. 5 shows molded article 11 during the stripping operation. Non-adhering sheet 6 is stripped from article 11 leaving adhering sheet 7 intimately and interfacially bonded to plastic mass 10 with printed numbers 9 fused within the surface of article 11. At cut out numbers 8, a portion of plastic mass 10, adhering strip 7 and the printed numbers 9 have been pushed through. The result is raised numbers 12 which include printed numbers 9, raised adhering film 7 and plastic mass 10.

FIG. 1A shows an alternative and preferred procedure wherein adherent sheet 7 and non-adherent sheet 6 are first physically combined and with numbers 9 and 8 in register prior to insertion into mold half 3. By this means the operation is far simpler and register between cut out numbers 8 and printed numbers 9 is assured. The composite two layer material is placed into the mold cavity with non-adherent sheet 6 against the mold wall. The composite material is held against the mold wall by any suitable means, e.g. electrostatic force produced as in FIG. 1. The subsequent molding steps and article are as in FIGS. 2 through 5 which have been previously described.

Needless to say, FIGS. 1 through 6 illustrate merely one type of article which may be produced according to the present invention and merely one form of molding. Where it is desired merely to produce a raised or indented design without additional coloration, the general steps indicated in FIGS. 1 through 6 are repeated but printed adhering sheet 7 is not utilized or if utilized for protection or overall coloration of the molded surface is not printed. The molten plastic mass during molding is pressed through the cut out portions of non-adhering strip 6 and when stripped the resulting object comprises a base article carrying raised (but uncolored) numbers.

If indented rather than raised numbers are desired, then non-adherent strip 6 is cut to conform to the numbers, is placed and held against the mold wall, plastic mass 10 is injected and non-adhering material 6 stripped therefrom. If one desires the indented numbers to also be a different color, one again utilizes adherent film 7 as in FIGS. 1 through 6. In this case adherent film 7 is printed except for the numbers which are clear and the color of the numbers corresponds to the color of the injected mass, while the background color is the color of adherent film 7.

When utilizing the process described above for the production of blow molded articles the procedure is essentially the same. A non-adhering sheet, the configuration of which at least in part corresponds to the desired relief decoration, is positioned against one wall of the blow mold. If additional coloration is desired, an adhering sheet is positioned in register on the non-adhering sheet between the non-adhering sheet and the parison. A hot soft tube of thermoplastic material is produced, for example, by extruding. It is clamped immediately in the mold and is expanded by compressed air such that it conforms to the mold wall surface. The gas pressure forces the molten thermoplastic material against the non-adhering sheet or, where used, the adhering sheet and conforms the molded material to the non-adhering sheet configuration. The resultant article is cooled and ejected from the mold.

In compression molding the non-adhering sheet is placed against one wall of the female mold. The adhering sheet, where utilized, is then placed in register. Thermosetting plastic molding powder is then placed in the mold and the mold is closed. Heat and pressure are applied thereby causing an irreversible chemical reaction in the molding powder. During molding there exists sufficient flow in the heated thermosetting mass such that it fills closely around the inserted sheets and thereby conforms the ultimately produced article to the desired decoration. The non-adhering sheet and adhering sheet may also be placed on top of the molding powder where they will contact the male mold during molding. The adhering sheet, where utilized, of course contacts the molding powder. It is additionally possible to use a two step compression molding technique wherein there is first formed a preform, the adhering sheet, where used, is placed on top of the preform, the non-adhering sheet is placed on top of and in register with the adhering sheet, the mold is closed and the mold cycle completed.

In the vacuum molding method only one mold surface is normally utilized. In this procedure the non-adherent sheet is placed against the mold surface, the adherent sheet next and then the molding material (usually in sheet form) is placed against the adherent sheet. Heat is applied while at the same time a vacuum removes the air between the sheets and molding material, and the mold surface. In this case the pressure exerted against the non-adhering sheet, the adhering sheet (where used) and the molding material is exerted by atmospheric pressure rather than pressure exerted by an additional mold wall or by stress on the injected or blown plastic mass.

It is believed clear that one may achieve many different effects according to the present invention. Thus if one desires each number to be of a different color, one utilizes different colored printed numbers on the adhering strip or separate colored strips, each covering a desired cut out number in FIGS. 1 through 6. Needless to say, the printed portions of the adhering sheet on the decoration need not be the same size as the cut out non-adhering sheet, it not being required that the printing cover the entire cut out portion. The printed decoration may be larger, smaller or the same size as the configuration of the non-adhering sheet corresponding to the desired decoration. During molding the nature of the adhering sheet is such that it is intimately and interfacially fused with the plastic mass and, as such, is essentially visually and physically inseparable therefrom at the edge of the decoration. It is further clear that the non-adherent sheet itself need not be the same size as the molded article where, for example, a raised border around the decoration or marking is desired.

Additional decorating effects may be obtained by varying the color and printed decoration on the adhering sheet. For example, in those instances where clear molding material is utilized, coloration of one surface of the entire article may be obtained by utilizing a solid opaque colored adhering film. Such a film will produce only coloration and will not result in a differently colored relief design. The adhering film may also be colored with the decoration portions clear. In this case a colored molding material will show through the clear and raised or indented portions of the ultimate article.

Where decorations of different depth or height are desired on the molded article, this can be achieved by the use of more than one non-adhering sheet, the configurations of which are of a different size. For example, in the illustration of FIGS. 1 through 6 one can first insert a non-adhering sheet which carries a cut out portion corresponding to the desired numbers. Positioned in register therewith one uses an additional non-adhering sheet containing slightly smaller or slightly larger cut out numbers. When the two non-adherent sheets are combined with a printed adhering sheet the resulting numbers will be of two heights with the printed portion corresponding to the highest or lowest raised portion or covering the entire number depending on the size of the printed numbers. As is obvious from this description, numerous effects with the various raised or indented designs are possible with the various combinations of one or more non-adhering sheets. It is, of course, possible to simultaneously produce a raised and an indented design on the molded article.

It is further clear that the printed portion of the raised or indented design can be of one or more colors. Such an effect is achieved by first printing the adhering sheet with a desired multi-colored design. Combined with such a multi-colored design carrying adhering sheet is a non-adherent cut out sheet such as described in FIGS. 1 to 6. The cut out portions are placed in register with the design and when molded the multi-colored design will appear raised (or indented) depending on the particular arrangement in the molding.

The printed adhering sheet may comprise a solid colored plastic film, wherein the entire film is colored both internally and externally. Alternatively, one may utilize a clear or translucent plastic film which by suitable means, for example, by printing, one side of the film contains the desired color and/or multi-colored decoration. In such a case the color of the injected mass will show through the clear or translucent portions of the adhering film. Normally such a film will be placed with the printed area intimately in contact with the plastic mass. This arrangement provides the best protection for the decoration since the remainder of the plastic film will be on the outside of the finished article. In such a case the inks utilized must be of a nature to adhere to the plastic mass or alternatively there must be sufficient non-printed areas to insure that the decoration is held tightly against the mass. Heat resistant inks which fuse as little as possible to avoid distortion should normally be used. In those instances where the decoration is not subject to wear or physical attack, the printed adhering sheet may be placed in the mold in such a manner that the printed side will be on the outside of the finished article. Needless to say, one may also utilize an additional clear plastic adhering film to protect the raised or indented design.

The height or depth of the relief design is, of course, dependent basically on the thickness of the non-adherent sheet. The only basic limitations on the thickness are practical limitations as to the decoration desired, economy, the handling properties of the films, the means used to hold the film in the mold, etc. Illustrative thicknesses for the non-adhering film are up to one-half inch and preferably up to one-eighth of an inch. The lower limit, of course, is dictated by the height or depth desired. The non-adhering sheet need not be of a particular color since it is not bonded to the ultimate object but is stripped therefrom. The surfaces should be smooth since normally the ultimate product surfaces, except for the decoration, are desired to be smooth. Naturally, however, where desired, one may impart an overall design to the non-adhering sheet as well as the cut out lettering, decoration, etc., such as by calendering a design on the film (e.g., a check pattern). Preferably the film is essentially unoriented when plastic film is used.

The adhering decorating film when used should be of such a nature that it will become intimately and interfacially attached to the molded plastic mass. The nature of the film is, of course, dependent to some extent upon the type of molding involved, the conditions of temperature and pressure, the composition of the molded plastic mass and the type of decoration carried by the film. Where the molding process involves the use of relatively high heat and pressure and where a design is printed on the adhering sheet, a thin flexible film ranging in thickness from about 3 to 11 mils and preferably 4 to 6 mils is particularly useful. This is especially true where the preferred electrostatic holding means is utilized and where injection molding procedures are used.

If such a film it too thin, for example 2 mils, excessive and often complete fusion results and the printed surface is distorted (runs) rendering the design unattractive or illegible. When the film is of greater thickness, for example 12 mils, the heat from the plastic mass is not uniformly distributed and smearing, differential stress and poor adhesion may result. Thus in the case of injection, compression or vacuum molding a thickness between about 3 to 11 mils is particularly useful when a decoration is carried on the film. On the other hand, if the adhering film is a solid color, for example, where it is used to impart overall coloration to a colorless plastic mass, the problem of running and distortion of the printed design does not exist. In such a case, substantially thinner film may be utilized, for example, films having a thickness between 1 and 11 mils.

When the molding procedure involves relatively low pressure and temperatures (e.g., blow molding) films with a smaller thickness range can be effectively utilized without a problem of distortion of the decoration existing. Films having a thickness of between 1 and 7 mils and preferably 2 to 4 mils are particularly effective in such cases.

The essential considerations involved in determining the thickness of the adhering film lie in the economy, bonding, handling properties, distortion of the design, if any, and the problem of stretch. During molding the adhering film must stretch to some extent when it is forced into and around the configuration of the non-adhering sheet. Hence where a relatively small cut out portion is utilized the adhering sheet should be relatively thin such that it can be forced into the cut out portions of the non-adhering sheet.

The adhering sheet during molding is held in intimate contact with the non-adhering sheet. During molding the surfaces of the adhering sheet are fused or bonded to the plastic mass and, in effect, lose their identity as a separate film overlay. In the finished molded plastic article the adhering film becomes interfacially bonded and blended with the plastic mass and generally no juncture is noticeable between the film and the surrounding portions of the plastic material.

The conditions during the molding operation are essentially the same as with conventional mold techniques wherein no adhering or non-adhering films are utilized. No particular precautions or steps need be taken. The film or films are suitably positioned against a mold wall and the plastic mass is then contacted with the film under heat and pressure. After a sufficient period of time has elapsed to insure that at least sufficient solidification has occurred to render the object rigid, the so produced article is removed and the non-adhering film stripped.

Both the adhering and non-adhering films or sheets are produced by known means. For example, when utilizing plastic films, a chilled roll casting technique may be utilized. The term "plastic film" with respect to the adhering film is intended to include both solid plastic films, laminated films or plastic impregnated paper foils. The latter materials are commonly used in compression molding, where thermosetting plastics are meployed. When printing the adhering sheet, conventional heat resistant inks may be utilized. Where necessary, the surfaces to be printed may be treated by chemical means, oxidation, sub-atomic bombardment, flame treatment, etc., to render them receptive to the inks employed. Conventional inks can be utilized, it being basically required only that the ink adhere tightly to the surfaces of the adhering film. This is particularly true where such printed surfaces are subjected to stress during the molding operation due to the printed portions being stretched. The inks should be substantially non-fusing such that the decoration will not be distorted during molding. Needless to say, when the adhering film is of a single color, the color may be imparted by pigmenting the entire film material or by printing. Since the printing inks normally will not fuse and adhere to the plastic mass suitable clear areas, particularly around the outside areas of the adhering film should be left such that adequate bonding will result.

The composition of the plastic mass injected into the mold and the composition of the adhering film must be of such a nature that the adhering film will become intimately bonded to the plastic mass. Generally the composition of the injected plastic mass will be the same as that of the adhering film.

The composition of the non-adhering film must, of course, be such that the film does not become intimately bonded during molding with either the injected plastic mass or the adhering printed film, so that it can be stripped from the injected plastic mass after cooling. Any material meeting these qualifications is suitable for use according to the present invention. Needless to say, the composition must be compatible with the means used to hold the sheet against the mold wall. For example, if the use of an electrostatic charge as a holding means is contemplated, the sheet must be capable of holding an electrostatic charge and being thereby secured against the mold wall during injection. Suitable materials for making the non-adhering film are preferably various plastic films such as those plastics described above, so chosen for their non-adherent properties under the conditions of the particular molding process used. Metal foils, protectively treated papers such as silicon treated paper, kraft paper, Quilon treated paper, oil treated paper, wood, glass, etc., may also be utilized.

The non-adhering film may be either inherently nonadhesive to the injected plastic or it may be internally or surface treated to render it non-adhesive.

Suitable choices of non-adherent films to be used in conjunction with the particular plastic mass, adherent films and molding methods will be obvious to one skilled in the art. Materials such as glass foils, metal foils, release treated papers, etc., can be used with almost any of the natural or synthetic polymeric materials and will be strippable therefrom. When utilizing the preferred plastic non-adherent films, suitable selection can be made from a wide variety of plastic materials. Certain polymeric materials are well known for their basic incompatibility with other polymeric materials and hence can be used as the non-adherent film or as the molded mass and adherent film. These plastics include polytetrafluoroethylenes, polycarbonates, polyesters and silicon resins. Generally a thermoplastic material will not adhere to a thermosetting material and hence wide choices are available by suitably combining such materials. Polyethylene and polypropylene will generally not adhere to polystyrene and the same is true in general with polyolefins and polyesters. In some molding methods (e.g., injection molding) the heat and pressure conditions and heat transfer are such that even where the adherent and non-adherent films are of the same composition no bonding between them will occur. Thus a wide choice of non-adhering materials is available. The basic requirement is only that the non-adhering sheet does not become bonded or adherent to the plastic mass or adherent film under the molding conditions utilized to such an extent that it cannot be stripped therefrom.

In order to position and hold the non-adhering and where desired the printed adhering sheet against the mold wall any suitable means may be employed. As illustrations, one may mention the use of locking pins, adhesives, ring members gripping the outer film edge on the outside of the mold, vacuum techniques, etc. The preferred means according to the invention involves the use of an electrostatic charge. This process is described and claimed in copending application Ser. No. 269,819, filed Apr. 1, 1963, now Patent No. 3,270,101.

According to this method a strip of film which is non-adherent to the plastic mass and which conforms to the desired decoration is held against the mold wall by electrostatic attraction. This can be done by charging before or after insertion either the film itself or the mold block. Static electricity generators such as the type described in U.S. Patent 2,163,294 can be employed. The film should be thin and flexible enough to be maintained in intimate contact with the wall of the mold so that it does not become distorted. The film thus securely held against the wall of the mold is maintained in a desired position relative to the ultimately produced article. Needless to say, where utilized, the printed adhering film is also secured against the mold wall in a similar manner. This method of attachment is preferred due to its simplicity and the fact that it does not introduce contaminates such as residues remaining when adhesives are utilized. Furthermore, this method allows the positioning in the mold of designed foils which are substantially smaller than the mold itself without any physical evidence of the holding means remaining in the finished article.

In the preferred embodiment according to the invention the adhering and non-adhering sheets are produced as a composite article, thereby allowing a simple one step operation in inserting the composite sheet into the mold and also insuring that registry is maintained between the configuration of the non-adhering sheet and the printed portions of the adhering sheet. These sheets may be held together by suitable means such as adhesives, ultra sonic sealing, crimping, electrostatic charge, etc. Needless to say, where more than one of either of the sheets is to be employed for various decoration purposes, these may also be held together as described above to produce composite decorating sheets. A further advantage of this arrangement lies in the ease in which the films may be held in the mold by a single holding means. The holding means for the composite sheet need be strong enough such that temporary handling may be accomplished but, of course, not so strong as to impair stripping.

The process of the present invention finds particular advantage in producing such articles as license plates where a raised and colored design is desired. Illustrative objects wherein raised or indented designs are desired which are not necessarily colored include bottles, compacts, tire treads, signs, credit cards, plastic keys, buttons, bottle caps, etc. Other illustrative objects where raised or indented designs are desired, with or without coloration, include novelty items, souvenirs, advertising items, signs, wall tile, plaques, pens, pencils, furniture, etc. The process may be utilized on either simple or complex injected molded articles and may be employed on flat or curved surfaces.

Regardless of the specific molding procedure utilized, the molded article is normally removed prior to complete hardening. Economies of mass production generally dictate that the article be removed from the mold as soon as it is sufficiently rigid for handling. As such, the relief decoration may not be entirely hardened and may be subject to distortion by the subsequent handling. For this reason it is sometimes advisable not to strip the non-adherent sheet immediately from the molded article since the non-adherent sheet will provide protection for the relief decoration. Furthermore, particularly where the relief decoration is intricate (e.g., small letters or numbers) and where the plastic material is brittle, it may be advisable not to strip the non-adherent sheet until after shipping to provide additional protection. In such cases the configuration and thickness of the non-adherent sheet is such that it is mated with the relief decoration and forms a flush surface. Needless to say, the non-adherent sheet may be stripped at once and then reused in the production of other articles of a like nature.

The relief decorated and additionally colored plastic articles produced by the present invention comprise a body of molded plastic material carrying a relief decoration (raised or indented). The decorated surface carries a decorating or colored film fused intimately within the relief decorated surface of the article where, in the preferred embodiment the colored side of the adherent film (i.e., that side carrying the colored film) contacts the moldable mass during the production of the article. The adherent film is sufficiently transparent such that the decorating or colored film (usually ink) shows through. The colored decoration is thus protected during subsequent use. The adherent film which initially carries the colored film is intimately and interfacially fused with the surface of the plastic body and substantially loses its physical and visual identity due to the fusion. This leaves physically and visually substantially only the colored film fused within the relief decorated surface at a depth corresponding to the thickness of the adherent film (i.e., normally 1 to 11 mils). The decorating film may cover the raised or indented portions of the body of molded plastic or only those surfaces which are not raised.

The following examples are provided to more fully illustrate the method of the invention and are not to be construed as an express or implied limitation thereof:

EXAMPLE I

A plastic advertising insert for a desk calendar was produced according to the present invention as follows: Polypropylene film having a thickness of 20 mils was internally cut out in the form of the desired letters. The film was then rubbed with a woolen cloth to induce a static charge. The now charged film was positioned on one wall of an injection mold and held by the electrostatic attraction. The mold was closed. With the mold at room temperature, molten polystyrene was injected under a ram pressure of 12,000 p.s.i. and a temperature of 550° F. The injection was completed in 10 seconds. After cooling, the partially solidified insert was removed and the polypropylene film stripped therefrom. The total mold cycle was completed in about 50 seconds.

The plastic insert comprised a flat plastic surface having the lettering raised above the surface. The lettering was clearly legible and no distortion of the letters was noted.

EXAMPLE II

A plastic license plate was produced according to the present invention as follows: Polyethylene film having a thickness of 15 mils was internally cut out in the form of numbers. A transparent, unoriented polystyrene film of 4 mils thickness was subjected to corona discharge and then printed with yellow numbers of a size slightly smaller than the cut out numbers in the polyethylene film. Both films were electrostatically charged and placed together in register. The composite film was then placed in the mold cavity and held by electrostatic attraction with the polyethylene film contacting the mold wall. The mold was closed.

A mass of blue polystyrene was injected into the mold under a ram pressure of 13,000 p.s.i. and a temperature of 575° F. After 30 seconds cooling the mold was opened, the license plate removed and the polyethylene film stripped. The resulting license plate comprised raised yellow numbers on a blue background. The color of the plastic mass injected showed through the clear portions of the polystyrene film. There were no physically determinable edges where the polystyrene film periphery became fused with the surface of the plastic mass and there was no distortion of the numbers.

EXAMPLE III

In a manner siminlar to Example I a plastic sign was produced as follows: A sheet of paper 30 mils in thickness was surface treated with Quilon (a stearate-chromic chloride Werner-type complex in isopropanol sold by E. I. du Pont de Nemours & Co.) in order to render it non-adherent. The so treated paper was internally cut out in stencil form to correspond to the desired lettering. The paper was then positioned on one mold wall of an injection mold and held by the application of a vacuum utilizing suitable vacuum ports in the mold wall. A white nylon molding compound type 6/6 was injected into the mold at a temperature of 600° F. and a ram pressure of 20,000 p.s.i. The mold prior to injection was held at room temperature. After partially solidifying the injected mass the sign was removed and the coated paper stripped therefrom. The sign comprised a white flat plastic surface having white letters in relief.

EXAMPLE IV

In a manner substantially identical to Example III above and using the same coated internally cut out paper a relief and color decorated sign was produced. In this example a sheet of nylon having a 5 mil thickness was placed on the coated paper. The nylon film was clear except for black printed letters carried on the surface which letters were slightly larger than the corresponding cut out letters in the coated paper. The nylon molding compound was then injected into the mold and the mold cycle and stripping completed as above. The resulting sign was essentially identical to the sign produced in Example III except that the raised letters were black while the flat surfaces were white where the color of the injected mass showed through the clear nylon film.

EXAMPLE V

A plastic women's compact top having an indented floral design was produced as follows: A film of polycarbonate having a thickness of approximately 10 mils was placed in an injection mold cavity and adhered to the walls thereof by electrostatic attraction. This film corresponded in external configuration to the desired floral design. Medium density polyethylene was injected into the mold at a temperature of 500° F. and a ram pressure of 15,000 p.s.i. After cooling the injected material, removing the partially solidified compact top from the mold and stripping the polycarbonate film, a compact top having an indented floral design was obtained.

EXAMPLE VI

Following the mold cycle and conditions of Example V above, the same compact top was produced in which the indented floral design was multicolored. This result was accomplished by utilizing a clear, unoriented polyethylene film having a 6 mil thickness. This film after surface treating by corona discharge carried a printed multicolored floral design corresponding in size to the external configuration of the polycarbonate film. The polycarbonate and polyethylene films were combined in register and held together by electrostatic charge. The composite film so produced was positioned in the injection mold and the mold cycle and stripping operation completed. The resulting compact top was characterized by a relief (indented) design of clear and distinct multicoloration.

EXAMPLE VII

A hollow plastic one gallon bottle was blow molded and relief decorated in the following manner: A parison or soft tube of polypropylene was produced by extruding at 450° F. and 2,000 p.s.i. The so formed parison was clamped in a blow mold of suitable configuration. Prior to the insertion of the parison, a film of polystyrene having a thickness of 15 mils and being internally cut out with the desired letters was positioned and held against the mold wall by electrostatic charge. Upon applying compressed air to the parison through an air injection needle, the parison was expanded to the shape of the cavity and polystyrene film, cooled and the so formed bottle ejected. The blow pressure was 100 p.s.i. and the mold temperature 157° F. The resulting bottle carried a raised decoration in the form of letters.

EXAMPLE VIII

A molded bottle having a colored raised decoration was produced in the manner of Example VII above. For this purpose a polyethylene film of 4 mils in thickness was attached by crimping to the internally cut out polystyrene film prior to insertion into the mold. The polyethylene film having been flame treated to render it receptive to printing inks was printed red in a shape conforming to the desired letters. The printed letters and cut out letters were placed in register. After positioning the composite film in the mold and holding it by electrostatic attraction the extruded polypropylene parison was expanded in the manner described in Example VII. After the completion of the mold cycle a raised and colored decoration on the plastic bottle was produced.

EXAMPLE IX

A decorated wall tile was produced in the following manner: A film of polytetrafluoroethylene of 25 mils thickness was placed in the bottom of the female half of a compression mold. This sheet had external configuration conforming to the designed decoration. The film was held in the mold by gravity. A mold charge of alpha cellulose filled melamine-formaldehyde molding powder was placed in the mold. The mold was then closed and a temperature of 300° F. and a pressure of 4,000 p.s.i. was applied. After completion of the mold cycle the film was stripped leaving a decorated wall tile, the decoration of which was indented.

EXAMPLE X

A novelty plastic ash tray having advertising lettering was produced in the following manner. A polyester film having a 10 mil thickness carrying internally cut out letters was combined in register with another internally cut out polyester film of the same thickness. The cut out letters of the first polyester film were slightly larger than those carried on the second polyester resin film. The combined films, held together by electrostatic charge, were placed in an injection mold and held against the wall thereof by electrostatic attraction. A charge of polyvinyl chloride was injected into the mold at a temperature of 350° F. and a pressure of 20,000 p.s.i. After completion of the mold cycle the ash tray was removed from the mold, the two films stripped and the ash tray carried advertising letters on a curved surface which were of two separate heights above the surface of the ash tray.

We claim:

1. A method for producing colored, relief decorated, molded plastic articles from a polymeric moldable material comprising
   (i) positioning at least one nonadherent sheet of material against a nondeformable surface of a mold wall, said sheet having a configuration which conforms at least in part to the desired relief decoration and a composition such that under molding conditions it does not adhere to the moldable material to the extent that it cannot be stripped therefrom,
   (ii) positioning an adherent sheet carrying a decoration on the nonadherent sheet, the composition of said adherent sheet being such that it will become intimately and interfacially bonded to the moldable material and will not adhere to the nonadherent sheet under molding conditions to the extent that the nonadherent sheet cannot be stripped therefrom,
   (iii) contacting moldable material against the adherent sheet under heat and pressure, the adherent sheet being between the moldable material and the nonadherent sheet and
   (iv) stripping the nonadherent sheet from the so-produced colored, relief decorated, plastic article.

2. A method of relief decorating a thermoplastic injection molded article comprising the steps of
   (i) positioning at least one nonadherent sheet on a wall of an injection mold, said nonadherent sheet being being of a composition such that after injection molding the article, the nonadherent sheet can be easily separated therefrom by stripping, at least a part of the configuration of said nonadherent sheet conforming to the desired relief decoration,
   (ii) positioning an adherent sheet carrying a decoration on said nonadherent sheet, the composition of said adherent sheet being such that it will be intimately and interfacially bonded with a thermoplastic mass injected into the mold and such that it will not adhere to the nonadherent sheet to the extent that the nonadherent sheet cannot be stripped therefrom, the decoration carried on the adherent sheet being such that it substantially conforms to that configuration of the nonadherent sheet which corresponds to the desired decoration and is in register therewith,
   (iii) injecting a thermoplastic mass into the mold, the adherent sheet being between the moldable material and the nonadherent sheet, whereby the thermoplastic mass fills the mold, the adherent sheet becomes intimately and interfacially bound to the thermoplastic mass and the thermoplastic mass and the adherent sheet conform closely to the configuration of the nonadherent sheet and
   (iv) stripping the nonadherent sheet from the so-produced article whereby a decorated thermoplastic injection molded article results, the decoration of which is in relief.

3. The process according to claim 1 wherein the plastic article is produced by injection molding.

4. The process according to claim 1 wherein the plastic article is produced by blow molding.

5. The process according to claim 1 wherein the plastic article is produced by compression molding.

6. The process according to claim 1 wherein the plastic article is produced by vacuum molding.

7. The process according to claim 1 wherein the nonadherent sheet has a thickness up to one-half an inch.

8. The process according to claim 1 wherein the nonadherent sheet comprises a plastic sheet.

9. The process according to claim 1 wherein the plastic article is produced by injection molding, the adherent sheet ranges in thickness from between 3 and 11 mils and the non-adherent sheet has a thickness up to one-half an inch.

10. The process according to claim 1 wherein the decoration carried on the adherent sheet substantially conforms to that configuration of the non-adherent sheet which corresponds to the desired decoration and is in register therewith.

11. The process according to claim 1 wherein the adherent sheet and the non-adherent sheet are combined in the form of a composite sheet prior to positioning between the non-deformable wall and the moldable material.

12. The process according to claim 1 wherein the adherent and non-adherent sheets are held aaginst the non-deformable wall prior to contacting with the moldable material by electrostatic attraction.

13. The method of claim 2 wherein the non-adherent sheet is up to one-half an inch in thickness and comprises a plastic sheet, the adherent sheet ranges from 3 to 11 mils in thickness and the non-adherent and adherent sheets are positioned and held on the mold wall prior to injecting the thermoplastic mass by electrosatic attraction.

14. The method according to claim 2 wherein the non-adherent and adherent sheets are combined in the form of a composite sheet prior to positioning on the mold wall.

References Cited

UNITED STATES PATENTS

| 1,847,574 | 3/1932  | Sigel          | 264—264 |
| 2,655,693 | 10/1953 | Adams          | 264—220 |
| 3,270,101 | 8/1966  | Jardine et al. | 264—22  |
| 3,324,508 | 6/1967  | Dickinson      | 264—22  |

JULIUS FROME, *Primary Examiner.*

J. R. THURLOW, *Assistant Examiner.*

U.S. Cl. X.R.

161—7, 167; 264—264, 26, 328, 89, 90, 319